United States Patent [19]

Kocib

[11] Patent Number: 5,401,419
[45] Date of Patent: Mar. 28, 1995

[54] CONSERVATION OF WATER IN OPERATING EVAPORATIVE COOLERS

[76] Inventor: Sidney Z. Kocib, 1315 Piper Dr., Lake Haven City, Ariz. 86404

[21] Appl. No.: 110,009

[22] Filed: Aug. 23, 1993

Related U.S. Application Data

[63] Continuation-in-part of Ser. No. 552,586, Aug. 30, 1990, abandoned, which is a continuation of Ser. No. 283,066, Dec. 12, 1988, abandoned.

[51] Int. Cl.[6] ............................................... C02F 5/14
[52] U.S. Cl. ........................................ 210/697; 165/1; 210/698; 210/699; 210/700; 210/701; 210/101; 261/DIG. 43
[58] Field of Search .................... 62/310, 305, 304; 261/DIG. 43; 165/95, 1; 210/696–701, 206, 101, 136

[56] References Cited

U.S. PATENT DOCUMENTS

| | | | |
|---|---|---|---|
| 3,085,975 | 4/1963 | Jennings | 210/697 |
| 3,171,427 | 3/1965 | McAlpine | 210/206 |
| 3,196,892 | 7/1965 | Savage et al. | 210/101 |
| 3,234,124 | 2/1966 | Frani | 210/700 |
| 3,256,203 | 6/1966 | Robertson | 252/178 |
| 3,336,221 | 8/1967 | Ralston | 210/700 |
| 3,346,488 | 10/2967 | Lyons et al. | 252/85 |
| 3,352,793 | 11/1967 | Robertson | 252/389 |
| 3,365,909 | 1/1968 | Brainard | 62/305 |
| 3,434,969 | 3/1969 | Ralston | 210/700 |
| 3,547,817 | 12/1970 | Hansen et al. | 210/700 |
| 3,578,589 | 5/1971 | Hwa et al. | 210/701 |
| 3,627,032 | 12/1970 | Glad | 165/32 |
| 3,639,645 | 2/1972 | Miller et al. | 252/180 |
| 3,699,048 | 10/1972 | Krueger et al. | 252/180 |
| 3,723,333 | 3/1973 | Freyhold | 252/175 |
| 3,754,741 | 8/1973 | Whitehurst | 261/151 |
| 3,759,387 | 9/1973 | Drayton, Jr. | 210/206 |
| 3,810,834 | 5/1974 | Jones | 210/698 |
| 3,820,353 | 6/1974 | Shiraishi et al. | 62/305 |
| 3,963,636 | 6/1976 | Harris | 252/181 |
| 4,089,796 | 5/1978 | Harris et al. | 252/181 |
| 4,640,793 | 2/1987 | Persinski et al. | 252/82 |
| 4,701,262 | 10/1987 | Chen | 210/701 |
| 4,775,485 | 10/1988 | Etani | 210/697 |
| 5,057,229 | 10/1991 | Schulenburg | 210/696 |

*Primary Examiner*—Peter A. Hruskoci
*Attorney, Agent, or Firm*—Stevens, Davis, Miller & Mosher

[57] ABSTRACT

The present invention relates to operation of residential or commercial evaporative coolers, more specifically, its subject matter is conservation of water needed to cool down ambient air in their operation.

18 Claims, 1 Drawing Sheet

CONSERVATION OF WATER IN OPERATING EVAPORATIVE COOLERS

REFERENCE TO RELATED APPLICATIONS

This application is a continuation-in-part of application Ser. No. 07/552,586, filed Aug. 30, 1990, now abandoned, which in turn was a continuation of application Ser. No. 07/283,066, filed Dec. 12, 1988, now abandoned, both disclosures of which are herein incorporated in their entirety by reference.

BACKGROUND OF THE INVENTION

1. Field of the Invention

The Related Physical Law and Different Ways to Make Use of It

The term "evaporative cooling devices" denominates several disparate systems and apparatuses, all of which function in diverse ways to take advantage of one and the same law of physics. Under that law a change of a liquid phase (for instance, water) into vapor phase can produce reduction of temperature with certain quantum of heat energy (called "heat of vaporization") involved in that phase change. This reduction of temperature is a common phenomenon and it is also observable in Nature. For instance, a sudden rain on a hot summer day will cause a drop in air temperature, because the evaporating rain removed the heat energy (i.e. the heat of vaporization) from the air.

This temperature drop resulting from a change of phases is a desired situation in operation of evaporative coolers. Raw water is introduced into an evaporative cooler for its vaporization with heat energy extracted from the outdoor air of a convenient quality. When a portion of water evaporates and the air drops its temperature, some water vapors are absorbed by the outdoor air passing through the heat exchange medium. By complete evaporation a volume of 1 lb of water produces a cooling effect of approximately 1050 Btu. The cooled air is a desired product of exchange of heat energy and is directed to rooms where cooling is desired. The water, which is an active agent of cooling, after completed heat exchange becomes useless and it is discharged to a drain.

This described arrangement is not the only one where Man makes use of that underlying physical law. An entirely different concept of cooling by evaporating water takes place in "cooling towers". Those are rather larger constructions to cool down hot water, not hot air, as is practiced in "evaporative coolers". There are "direct" and "indirect" types of cooling towers. One design of "indirect" type of cooling tower is described in U.S. Pat. No. 3,820,353 granted on Jun. 28, 1974 to Shiraishi et al. for "Evaporative cooling apparatus".

However, a more common one is the type of "cooling tower" in which hot water is brought for its subsequent cooling by direct exposure to outdoor air. One such representative design of "direct" type "cooling tower" is described in U.S. Pat. No. 3,627,032 to Glad et al for a "Cooling tower water treatment system". In "cooling towers", unlike in "evaporative coolers", the subject of the cooling process is hot water, and cooled water (not cooled air) is the end product of cooling. In Glad's, and similar types of "cooling towers", hot water is cascading over vertical surfaces, or is sprayed against a draft of outdoor air. In a direct contact with ambient air hot water releases its heat energy to passing air. Hot and humid air, after the contact with hot water, is discharged to atmosphere as useless substance, while cooled water is collected in the basin of the "cooling tower" from where it is recirculated back for its further use.

It can be seen that "evaporative coolers" differ from "cooling towers" in design as well as in operation, and in nature of their end products.

2. Description of the Prior Art

Explanation of some basic terms used hereinafter:

Evaporative cooling—a process in which hot air is in direct contact with water causing water to evaporate. During this process sensible heat is removed from the air (i.e. the air cools down).

Evaporative coolers—smaller mechanical devices used for cooling rooms and premises. In "evaporative coolers", ambient air is drawn through heat exchange media wetted with process water to release a portion of its heat energy while absorbing some moisture. Evaporative coolers reduce the heat load in rooms or premises by forcing out hot indoor air by the cooled outdoor air, providing acceptable comfort level to inhabitants. Evaporative coolers exist as "direct" or "indirect" type; direct type prevails.

Heat exchange media—porous stationary or rotary pads wetted with circulating water. Through them the hot outside air is drawn for removing its heat energy.

Scalants—water hardness minerals dissolved in the raw process water and deposited on heat exchange media after the water evaporates.

Raw water—potable water generally containing scalants, supplied to an evaporative cooler from city wells and reservoirs or other natural water resources.

Circulating process water—a mixture of raw water and excess process water (cascading over the heat exchange media and enriched by scalants washed down from these media), collected in the water basin of an evaporative cooler.

Evaporative coolers have been and are still being manufactured. The manufacturer's instructions for operating such evaporating coolers, such as set forth in the "use and care" manuals enclosed with the evaporative coolers, require the use of a "bleed-off" system by which a portion of the circulating process water is eliminated from the evaporative cooler. The same "use and care" manual also recommends against use of chemical additives or any water treatment other than bleed-off in operating the cooler.

SUMMARY OF THE INVENTION

This invention (with two novel methods) describes changes in operation of evaporative coolers. It offers considerable advantages over the prior art in that

* it permits in one method described hereabove to reduce consumption of supply water by partially reducing the bleed-off portion of process water in evaporative coolers beyond the rate known and/or designed in the prior art, and/or in another herein described method to cancel the bleed-off completely, increasing thereby the gain of conserved water up to the reasonably possible maximum;

* it provides an agent, which, when introduced into the circulating process water, allows either partial reduction of bleed-off, or its complete elimination;

* it improves the saturation of heat exchange media by reducing or cancelling bleed-off and in that way increases the cooling effectiveness of evaporative coolers;

* it reduces the total cost of water and electric power in operating evaporative coolers;
* it prolongs the actual life of evaporative coolers by eliminating or greatly decreasing the corrosive action caused by water hardness minerals; and,
* it shows a way to massive savings of our natural water resources.

Various modifications of this invention are possible which will be apparent to those skilled in the art and which can be resorted to without departing from the spirit and scope of the invention as defined by the following claims.

BRIEF DESCRIPTION OF THE DRAWINGS

Drawing figures and reference to numerals in drawings.

Figure 1:
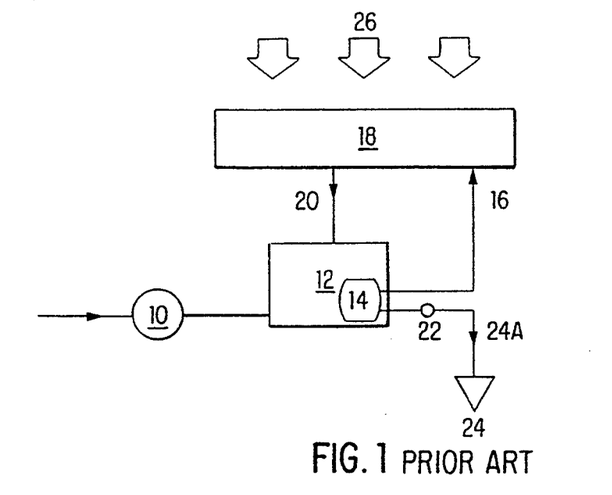
FIG. 1 presents a scheme of operation of a typical evaporative cooler used in prior art.
Figure 2:
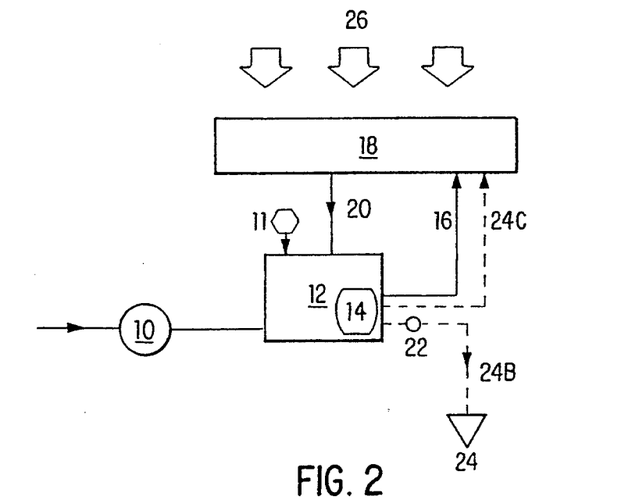
FIG. 2 presents a scheme of operation of the evaporative cooler when practicing this invention.
Figure 3:
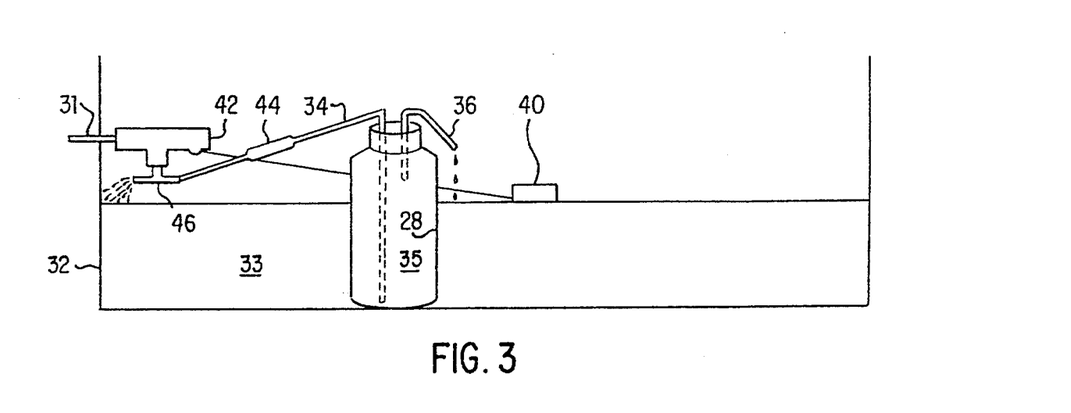
FIG. 3 is a schematic sectional view of a dispensing means for a concentrated chemical agent in an evaporative cooler.

10 Float valve to open or close a supply of raw process water
11 Device for distribution of agent
12 Water basin of evaporative cooler
14 Water distribution device—pump
16 Circulating water line
18 Heat exchange media
20 Excess circulating water
22 Pressure clamp for regulation of bleed-off
24 Drain line
24A Bleed-off- prior art
24B Bleed-off- new method (10% to 80% of 24A)
24C Increase of circulating water (90% to 10% of 24A)
26 Air drawn through the heat exchange media
28 Concentrated chemical agent container
31 Raw water line
32 Water basin
33 Circulating process water
34 Raw water flow line to concentrated chemical agent container 28
35 Concentrated chemical agent
36 Delivery line for chemical agent 35
40 Float
42 Float valve
44 Check valve to prevent backflow of concentrated chemical agent 35 through raw water flow line 34
46 Three-way connector The evaporative cooler of prior art (FIG. 1) operates as follows: Raw water is supplied into a water basin (12) for circulation. From there the larger portion of circulating process water is directed by the immersion pump (14) via the line for circulating process water (16) to the heat exchange media (18), where most of it is used in the process of evaporation. Excess of unused water (20) descends back into the basin (12), where it mixes with new supply of raw water and then is redistributed back to the media. Portion of process water from the basin (12) is forced by the same pump (14) into a drain line (24). This portion of process water drained out from the basin is called a "bleed-off" (24A). The desired volume of bleed-off is usually controlled by a simple pressure clamp (22). In order to maintain proper level of circulating process water needed for the optimum operation of cooling system, a simple float-valve (10) opens or closes the raw water flow to the basin (12).

In bleed-off in the prior art operation a sizeable portion of process water with high content of harmful scalants is removed from the system and is at the same time replaced with raw water, so that the concentration of hard water minerals is maintained on low level. Manufacturers of evaporative coolers establish clearly its necessary volume. That volume depends on the model of evaporative cooler and volume of air passing through its heat exchange media. To cancel bleed-off completely, or even only partially in the prior art operation is an idea neither thought of nor practiced. Following manufacturer's condition that no chemicals are to be used in the prior art, naturally any reduced volume of bleed-off" or the "no bleed-off" situation would cause the problems described in next section.

As much as "evaporative coolers" represent low-cost cooling with a low demand on energy, they constitute a large portion of all cooling systems in the dry and hot climate of the Southwest (of the United States). To maintain the indoor temperature at the desired level, the cooler often runs continuously all day long, with the cooling season often lasting from March in some locations to October. In their operation the actual volume of water wasted to the drain from only one such unit may reach tens of thousand gallons of water year after year. It is immediately apparent what an enormous burden on existing fresh water resources their operation in the prior art represents.

Furthermore, in the dry season during which evaporative coolers are most frequently used, specifically in the Southwest region of the United States, the rain is scarce and water reservoirs are not replenished fast or sufficiently enough. Still, because of the economy of their installation and operation, and because of the sufficient cooling effect provided with low consumption of energy, the number of the newly installed evaporative coolers grows daily.

Content of Hard Water Minerals in Process Water

Raw water takes active part in the cooling process in both "cooling towers" and "evaporative coolers". Its content of hardness minerals, which are salts of earth elements collected by water from its point of entry as rain or snow to its extraction point as potable water, is causing problems in many applications of raw water, and also in this specific one. Upon its partial evaporation raw water leaves behind a portion of its dissolved water minerals, also called "scalants", because after evaporation of such hard water they form a layer of scale on the substrate. Their total content generally depends on the source of water and soil condition in different geographical regions. The prevailing type of scalant is calcium carbonate ($CaCO_3$).

In order that content of scalants in process water steadily increasing after several cycles of its contact with air does not interfere, for instance, with further use of cooled water coming from "cooling towers", or, does not prevent passage of air through heat exchange media in "evaporative coolers", it is necessary to keep their content on a manageable level. In the operational step called "blow-down" (with "cooling towers") and "bleed-off" (in "evaporative coolers") a portion of process water with increased content of scalants is removed from the cooling system and discharged to drain. U.S. Pat. No. 3,365,909 granted to D. S. Brainard for "Evaporative cooling device bleed water arrangement" describes a convenient way for removal of a portion of a process water from "... evaporative cooling devices such as cooling towers, condensers and water coolers ..." when no chemical products for treatment of scalants are employed. U.S Pat. No. 3,627,032 "Cooling tower water treatment system" granted to Glad et al. on the other hand describes operational improvement and economical fashion to introduce chemicals, primarily strong acids or bases, to the water in "cooling tower".

For operating "evaporative coolers" in the prior art the "USE AND CARE MANUAL" (ArvinAir publication #L409501A) directs users of their manufactured evaporative coolers to discharge a clearly established volume of process water as bleed-off within a specified time period. By this arrangement the content of scalants can be maintained at their acceptable level. Yet contrary to the method described in Glad et al. for "cooling towers", where many chemicals are used conceptually, the above mentioned "USE AND CARE MANUAL" in the prior art rejects "... use of chemical additives or any water treatment other than bleed-off ...".

In a continuous flow of process water over the body of heat exchange media of an evaporative cooler, wetting them and evaporating therefrom, process water leaves behind a tiny layer of hard scale over the media surface, and while descending over heat exchange media to the basin it picks up 1) impurities, consisting mostly of pollen and dust, brought with the air passing through these media, and also 2) already deposited fully or partially crystallized particles of scalants. This mixture is again and again recirculated over the heat exchange media. As follows, the content of scalants in circulating process water steadily increases and the total hardness of process water in the water basin (12) is always higher than the total hardness of the original raw water. If not attended to, build-up of scale all over the heat exchange media (18) could become heavy, potentially restricting the air passage. This, and poor evaporation of water from the media encrusted with scale, would decrease cooling efficiency. One remedy is to delay formation of scale by decreasing the concentration of scalants in process water by 'bleeding' them off the system.

Generally acceptable content of scalants to be maintained in process water circulating in evaporative coolers in the prior art is only about twice of their original content in raw water when of extreme hardness. (If the raw water has lower content of scalants, the ratio may be higher.) It is obvious, that to maintain low concentration of scalants in circulating process water by following directions of the prior art, large volumes of water are wasted. For instance, in operating the most common model of "evaporative cooler" Mastercool (6,500 cfm air flow) in the prior art according to its manufacturer's directions, about 3,000 gallons of water are drained as bleed-off from only one such a unit in every 500 hours of its operation.

Advantages of this Invention

This invention provides two new methods for operating evaporative coolers. They shall replace the one presently used in the prior art. The term "evaporative coolers" used here comprises both the direct and the indirect type of evaporative coolers as they are known in the art. No distinction is being made herein between so-called "drip-type direct evaporative coolers" where water is distributed by forces of gravity from channels located above heat exchange media (pads) and other styles of direct evaporative coolers using rotary drum, or roller pads, or the slinger-type coolers.

The subject matter of this invention is to conserve water. By using either the first method with partial reduction of bleed-off, or the second method with completely cancelling the bleed-off, sizeable volumes of natural water can be conserved in every cooling season.

It is another object of this invention, a) to help our environment by conserving our natural water resources, b) to provide effective control of excessive scale formation, c) to keep water hardness minerals in process water in a temporary suspension even at their higher concentration, d) to improve saturation rate of heat exchange media with process water. As surprising results to using these novel methods described below it is possible a) to improve the overall cooling effect without any need to install larger water pumps, b) to increase the output of cool air, and thereby to shorten periods of operating time needed for cooling the premises, with result that less electric power is used, c) to extend the actual life of "evaporative cooler" or heat exchange media by action of the selected chemical agent added to process water, and d) to reduce water and electricity bill of users of this cooling system.

The Invention and New Methods of Operation (FIG. 2)

When using the described type of evaporative cooler I had soon noticed that the consumption of water needed for its operation is unreasonably high. I found out that the total volume of water needed to operate such and similar types of evaporative coolers is in fact a sum of a) volume of water evaporated during the operation and needed to remove content of sensible heat from outdoor air, to provide the desired cooling effect, b) volume of water needed to remove by bleed-off enough of the steadily increasing content of scalants, to maintain concentration of scalants in the circulating process water on acceptable level, when no chemicals can be used.

Both portions of water described above are in the prior art equally important for the peak performance of evaporative cooler. There is no advantage in reducing the flow of water used to wet heat exchange media (18). This volume of water must be large enough to wash away the dust, pollen particles, and partially congealed scalants from the media, and wet them sufficiently for optimum cooling.

The unexploited possibility how to conserve water, an option not known or not considered in the prior art, is in reducing the volume of bleed-off (24B) while using suitable chemical means to control increased content of sealants in process water. In the prior an the volume of bleed-off is clearly and specifically established by manufacturers of evaporative coolers, and it is about ¼ of the volume of process water distributed over the heat exchange media (18). The essence of this present invention, and the departing point from the prior art method of operation, is the idea of either partially reduced or a fully closed bleed-off line, and at the same time to introduce a blend of specific water treatment chemicals into process water. Both these steps are equally important to conserve water, which is the subject matter of this invention, and both are against the rules set in the prior art "Use and care manual" for evaporative coolers. As explained, reduced or canceled bleed-off without further action would lead to a build-up of scale, which situation would interfere with efficient cooling. Similarly, adding only water treatment chemicals to process water would keep heat exchange media cleaner, but their presence by itself will not conserve any water.

During many tests of process water for total hardness content, when operating the cooler under described new methods, it has been confirmed that the volume of conserved water can be quite substantial, even with only a partially closed bleed-off line. If the rate of bleed-off (as established by one of the manufacturers of evaporative coolers) of the prior art is taken as 100%, the partial reduction of bleed-off can be anywhere from about 5% up to 90%, preferably from at least 20% to as much as 90% (twenty to ninety percent). The new model of coolers, having suitable mechanical arrangement for automatized draining/cleaning/rinsing cycles and other improvements, provide for their safe operation with a fully closed bleed-off line and for unprecedented volumes of water which can be conserved.

While operating evaporative coolers with the bleed-off line only partially closed, by action of chemical means suggested below, results in smaller volumes of conserved water, this method offers other compensating benefits. One could be a leisure of operating the cooler with only partially closed bleed-off line, when no particular attention and cleaning is required. In the other method of operation, with bleed-off line fully closed, unless this method is practiced with a new model of cooler (as described in related section below), its user must periodically drain the process water with high content of scalants, he must rinse and clean the basin and heat exchange media before the next period of operation. This, of course, represents demand on time and requires physical effort, too. However, the choice between the partially and fully closed bleed-off line will be with each user of evaporative cooler. Both methods are presented here because each one suits a particular situation. Also, there is a number of units of evaporative coolers presently in operation, which can be easily converted to operation with partial reduction of bleed-off, but not to the fully automated method described below.

In the prior art, in smaller residential or larger commercial evaporative coolers, the volume of bleed-off is specified by manufacturers as follows:

TABLE 1

VOLUMES OF BLEED-OFF (B/O), WATER CONSERVED WITH 50% REDUCED OR FULLY CLOSED B/O

| Designed Bleed-off | | Bleed-off reduced to 50% | | Concerved water at 50% b/o | "no b/o" |
|---|---|---|---|---|---|
| gph | gpd | gph | gpd | gpd | gpd |
| 5.9 | 141.6 | 2.9 | 69.6 | 72.0 | 141.6 |
| 6.8 | 163.0 | 3.4 | 81.5 | 81.5 | 163.0 |
| 7.9 | 189.6 | 3.9 | 93.6 | 96.0 | 189.6 |
| 9.5 | 228.0 | 4.8 | 115.2 | 112.8 | 228.0 |
| 10.7 | 256.8 | 5.3 | 127.2 | 129.6 | 256.8 |
| 10.8 | 259.2 | 5.4 | 129.6 | 129.6 | 259.2 |
| 12.6 | 302.4 | 6.3 | 151.2 | 151.2 | 302.4 |
| 15.2 | 364.8 | 7.6 | 182.4 | 182.4 | 364.8 |
| 18.7 | 448.8 | 9.3 | 223.2 | 225.6 | 448.8 |

REMARKS:
gph = gallons per hour  gpd = gallons for 12 hrs per day
Source for "Designed Bleed-Off" values: Technical specifications, Arvin Air Co.

Experiments described in this section were intentionally not conducted in any orderly sequence. During the first testing period several rates of bleed-off discharge—in departure from the manufacturer's recommended flow of 12 fl.ozs in 1 minute in the prior art—were applied, such as:

12 fl.ozs in 75 seconds (1 minute and 15 seconds); 12 fl.ozs in 95 seconds (1 minute and 35 seconds); 12 fl.ozs in 120 seconds (2 minutes); 12 fl.ozs in 165 seconds (2 minutes and 45 seconds); 12 fl.ozs in 300 seconds (5 minutes); and 12 fl.ozs in 600 seconds (10 minutes).

Suggested rate of bleed-off for the system used in the prior art was 12 fl.ozs in 60 seconds (1 minute), and all reductions were pro-rated as follows: with the new rate of flow being 12 fl. ozs in 75 seconds (i.e 9.6 fl.ozs in 60 seconds) the flow was reduced to of the original ratio, and the effective bleed-off reduction was 20%. Similarly, when the flow was at 12 fl.ozs in 300 seconds, i.e. 2.4 fl.ozs in 60 seconds, the bleed-off was reduced to 20% of its original ratio, and the effective reduction of bleed-off was about 80%.

In following testing period of 25 weeks the basic pattern of the first testing period was approximately followed while using different compositions or agents.

The figure for mean bleed-off reduction rate was calculated from the sum of days of operation and from effective rates of nominal bleed-off reduction at various periods within all 47 weeks. Per day, it was about 48.40% of bleed-off rate established by manufacturer in the prior art. At any of the new reduction rates the content of scalants in bleed-off was measured and calculated as 'total hardness', and it is expressed in mg/L (ppm) as $CaCO_3$.

The initial total hardness of raw water supplied to the cooler was averaged to be at about 320 mg/l (as $CaCO_3$). In all measurements mostly the TAYLOR CHEMICALS "Total hardness test kit #K-1503" was used, and occasionally the HACH SR/3 spectrophotometer was also used. To measure the pH values, SARGENT-WELCH portable pH meter was used with its combination electrode.

The following results were obtained from the evaporative cooler MASTERcool, a model with a nominal output of 6,500 cfm, with one rigid saturation pad as a heat exchange medium slightly used before. Test duration: 47 weeks in total.

TABLE 2

| CONTENT OF SCALANTS AS RECORDED: | | |
|---|---|---|
| Bleed-off reduced to: | Flow of 12 fl. oz. in: | Water hardness level: |
| 8% | 12.00 minutes | 1190 ppm* |
| 10% | 10.00 minutes | 990 ppm* |
| 20% | 5.00 minutes | 1140 ppm |
| 22% | 4.50 minutes | 1030 ppm |
| 35% | 3.10 minutes | 780 ppm* |

TABLE 2-continued

| CONTENT OF SCALANTS AS RECORDED: | | |
| --- | --- | --- |
| Bleed-off reduced to: | Flow of 12 fl. oz. in: | Water hardness level: |
| 47% | 2.15 minutes | 890 ppm |
| 48% | 2.10 minutes | 930 ppm |
| 48% | 2.15 minutes | 970 ppm |
| 50% | 2.00 minutes | 860 ppm |
| 50% | 2.04 minutes | 840 ppm |
| full flow | 1.00 minute | 560–630 ppm |

REMARK:
The relative humidity of outdoor air was at the level favorable for evaporative cooling during the day. In some test's periods the dew point value was very close to 55° F., and the relative humidity of outdoor air was very high; this situation is marked with asterisk (*).

During periodical inspections, as well in the final inspection at the conclusion of tests, the heat exchange pad was clean, without considerable scale deposits. This was a proof that partial reductions of bleed-off leading to a reduced consumption of fresh water in operating these coolers are indeed possible when specific chemical agents are simultaneously used.

After two years of operation with bleed-off reduced to 50%, when the content of scalants in process water was about 3 times higher than in the supply water, the system was very clean indeed, and devoid of corrosion. After six cooling seasons, the original set of heat exchange pads is still used, doubling its life expectancy of about 3 years in average. It shows, naturally, a few isolated signs of structural weakness in some places, but the deposit of scale is minimal. There has been no need for any chemical cleaning and/or for removing the hard water scale at any time, as is generally the case with the prior art coolers in this area of the country.

The percentage of partial reduction of bleed-off, if this method is chosen, generally depends on the initial level of scalants in fresh raw water supply. In regions where that initial level of scalants is about 100–150 mg/L (expressed as $CaCO_3$), the reduction of bleed-off can be up to 90%. In regions where supply water contains about 300 mg/L or more of water hardness minerals (as $CaCO_3$) the rate of reduction is lower. It is possible to increase the content of active chemical means in process water (2–3 times, for instance) and reduce the bleed-off flow by up to 90% of its original volume in the prior art operation, and to enjoy safe operation of the cooler even in regions with very hard raw water.

The reduction of bleed-off volume is, in fact, conservation of raw water. The volume of circulating water retained in the evaporative cooler by either partially or fully reduced bleed-off is redistributed over the heat exchange media, where it replaces a volume of water previously (in prior art) drawn from raw water supply line.

During the above experiments different chemical agents were tested, and the resulting levels of scalants were recorded. Regardless of subsequently higher content of minerals in the circulating process water (caused by a partially reduced or a fully closed bleed-off) most of the tested agents were able to control formation of scale on heat exchange media. Heat exchange media were fully passable with minimum formation of scale as a white layer.

Conservation of water made possible with using either of these two methods is the subject matter of this invention. However, introducing specific chemical agents into circulating process water also resulted in better performance of the system, and in extended life expectancy of its parts.

Technically, for the optimum of cooling output the media must be as completely wetted with water as possible. The more saturated with water the media are, the more moisture is transferred to the passing air. The more moisture the air evaporates, the cooler is the air forced into the dwellings and other premises. The saturation efficiency of most new coolers is at about 80%, which means that 20% of the media are dry. In the evaporative cooler with 80% saturation of heat exchange media the passing air can absorb only 80% of moisture from theoretically possible 100%. Consequently, it only releases 80% of its sensible heat and the cooling effect is imperfect.

One factor affecting saturation of heat exchange media is also the volume of bleed-off. In the common type of evaporative cooler one pump (14) delivers a portion of a circulating process water to heat exchange media (18), and at the same time another portion to drain (24) as bleed-off. The effective output of pump is thus split into two destinations, and once the volume of bleed-off is set up, the pump generally maintains its operating pattern: If more water is delivered to bleed-off discharge line, less water is available for heat exchange media and vice versa. The ratio of volume of water delivered to those media to the volume of water discharged as bleed-off is in some larger systems of the prior art about 3:1. That means, that if 0.48 gpm is delivered by the pump to media, 0.16 gpm drains out through its bleed-off port.

In one described operating method (FIG. 2) the rate of discharge of bleed-off (24B) from the system is reduced, and thereby a larger volume of circulating process water is now available for the heat exchange media. By reducing bleed-off to only about 50% of its designed volume, the volume of water now delivered to media would increase by 0.08 gpm (24C) to a total of 0.56 gpm, a gain of about 20% over the original projected volume. This 20% increase over the original saturation of the media could in most cases result in near perfect saturation. It can be asserted, that if the passing volume of conveniently dry air through about 80% saturated heat exchange media of a typical prior art unit of evaporative cooler results in cooling by 25° F. (as has been established), then at the near 100% saturation the cooling efficiency of the system would improve by 20% to about 30° F.

When using the "no bleed-off" method of this present invention, the saturation rate and the maximum cooling effect exceed any possibility of the prior art evaporative cooler configuration.

This improved cooling efficiency would in turn effectively lead to shorter periods of system operating time, needed for reaching the desired indoor temperature, and thus to savings of electrical power. This is, in fact, another positive result of this invention.

The Chemical Character of Selected Agents

From many available chemicals designed to control deposition of scale and/or corrosive processes caused by hard raw water both in specific cooling systems (such as cooling towers) and in water boilers, only a very few chemical compounds are suitable for the object of this invention. For instance, only a relatively few ingredients possess the advantage of a "threshold effect", when a very small quantity of the chemical agent is capable of fully controlling scale deposition, as opposed to the other compounds that will have to be employed in volumes much larger to induce the desired effect.

Some ingredients, generally capable to control scale deposition of raw water, are less effective—or even rapidly degrading—when used in the presence of chlorine, which is commonly used to kill pathogenic bacteria in city water.

On the market there is a wide selection of many established products of different composition, and as follows, of different results. After extensive research of available products a few new compositions were found. Those most promising products with extended effectiveness were tested to confirm that they can provide acceptable control over production of scale, even with the greatly increased content of scalants in the process water of evaporative cooler operated by the methods of this invention.

The following list exemplifies suitable chemical compounds commercially available for use in both proposed methods of the present invention. It cannot be considered exhaustive. As is well known, new chemical compositions may appear on the market and they also may be considered valuable agents for the object of the present invention:

| Chemical Product | Abbreviation |
|---|---|
| Aminotri(methylene phosphonic acid) | AMP, or, ATMP |
| Pentasodium salt aminotri(methylene phosphonic acid) | Na$_5$ATMP |
| 1-hydroxyethylidene-1,1-diphosphonic acid | HEDP |
| Diethylenetriaminepenta(methylenephosphonic acid) | DTPP |
| Sodium salt of DTPP | Na$_7$DTPP |
| Hexamethylenediaminetetra(methylenephosphonic acid) | HMDP |
| Hexapotassium salt of HMDP | K$_6$HMDP |
| Hexasodium salt of HMDP | NA$_6$HMDP |
| Ethylenediaminetetra(methylenephosphonic acid) | EDT MP |
| Hexaammonium salt of EDT MP | (NH$_4$)$_6$EDT MP |
| Hexapotassium salt of EDT MP | K$_6$EDT MP |
| 2-phosphonobutane-1,2,4-tricarboxylic acid | PBTC, or, PBS-AM |
| Polyacrylic acid and its salts (with limitations) | PA |
| Polymaleic acid and its salts | PMA |
| Phosphinecarboxylic acid and its salts | PCA |

Their manufacturers claim that their products (listed above) can be used alone. Yet for improved activity I prefer their combination with other products. They can be combined with each other, or with some other water treatment chemicals (such as chelating agents), or with other specific agents to take advantage of their synergistic action resulting from such combination. In addition, when specific results were desired, I incorporated other ingredients as well, such as algicides, surface active agents, hydrotropic agents, pH color change indicators, thickening agents, etc.

Chemical Agents Employed

Formula to calculate needed dosage (mg/l) of agent of specific content of active ingredients, for the total volume of raw water used in a considered period of operating the evaporative cooler:

$$D, \text{mg/L} = \frac{\frac{F \times AC, \%}{100} \times 1,000,000 \text{ mg/L}}{V} \quad (I)$$

Formula to calculate total volume of chemical agent needed for estimated volume of raw water to be used in expected period of operating the cooler:

$$F, \text{liters: } \frac{\frac{V \times D}{AC, \%} \times 100}{1,000,000} \quad (II)$$

Formula to calculate the total volume of water to be used by a specific model of "evaporative cooler":

$$V = Q \times t \quad (III)$$

where:
F = feed of chemical agent, liters
AC, % = weight percent of active chemicals in chemical agent
D = dose of chemical agent, mg/L
V = total volume of raw water estimated to be needed in certain period of operating evaporative cooler, in liters
Q = consumption of water specified by the manufacturer of evaporative cooler for each particular model, in liters per hour
t = time in hours of expected operation of the cooler For the method of only a partial reduction of bleed-off, active ingredients in the process water can be at the level from 0.5 to 500 mg/L (ppm) by weight, calculated on the total volume of raw supply water. Normally with this method of partial reduction of bleed-off, the amount of most of the above listed active chemical ingredients will be between 2 and 10 mg/L (ppm), and preferably (for partial reduction only) at 2–5 mg/L (ppm), calculated on the volume of raw supply water. In some geographic locations there may be a minimum deposition of water scale over heat exchange areas of the equipment when the bleed-off is reduced. It is advisable, however, to apply the specific chemical agent even then to improve spreading of water over heat exchange media by its reduced surface tension.

When the novel method of a completely closed bleed-off is practiced, up to 30,000 mg/L of active matters may be introduced to the basin with each new charge of raw supply water for a cooler of about 6,500 cfm air output.

Depending on the particular method of introduction, the agent may be in a liquid form, in a powder form, or it may be compressed into tablets. It may also have the form of a sponge-like product.

During the test periods of 1987 and 1988 a total of 9 samples of agents of different composition were prepared and tested. Activity and chemical capability of several different brand names of an individual chemical agents were compared to each other, or against other individual compositions.

| The starting sample was as follows: (1) | |
|---|---|
| water | 72.00% by weight |
| Belclene 200 (Polymaleic acid) | 16.00% |
| Dequest 2010 (HEDP) | 4.00% |
| Potassium hydroxide, flakes | 8.00% |

Specific gravity was 1.115 and pH was adjusted to 7.6 using additional KOH. Chemical activity was calculated to be at about 11.5%, based on information of basic ingredients from their manufacturers.

At the beginning of each test period 120 ml (about 140 grams) of the product were introduced to the system. According to a calculated content of active matters, this volume should be able to chemically treat approx. 7,500 liters (about 2,000 gallons) of raw water, at concentration of active matters of about 2 mg/L (2 ppm). The actual concentration of active matters, immediately after introduction of this agent was in fact higher, however, it was reasoned that this higher content of active matters would:

(a) act as a shock-treatment to loosen scalants already congealed, (b) penetrate into mass of heat exchange media, stay there and be slowly washed out later on, thus, acting as a kind of a buffer.

Other liquid compositions were tested in six formulations 1(a) to 1(f) using products Bayhibit AM (PBTC), Dequest 2010 (HEDP), Unihib 305 (ATMP), Mayoquest 1320 (ATMP), Mayosperse (PA), Belclene 200 (PMA), Belcor 575, either alone, or in a combinations. The content of active matters was formulated to be at about 11–12%, and alkalinity of each individual product was adjusted to be around value of pH 7.00. After completed testing no proof was found that the degree of control over scale deposition would change significantly with different products, if one takes into consideration differences in their chemical potency.

It is indeed possible to make modifications of the basic formula to suit a specific way of their performance or their introduction into the system. For instance, to increase viscosity of the basic product, a thickening agent from a number of commercially available products (in this case, it was Natrosol HHR 250, and later, Tixogel WM) can be used in small percentage, usually between 0.2 and 0.5% b.w. Some other ingredients may also be incorporated with the basic active chemical compositions, such as the hydrotropic and surface active agent for reduction of surface tension of circulating process water over the heat exchange media. These may be used at less than 2–3% (by weight of the total product), depending on the choice of such ingredient.

| One such typical formulation consisted of: (2) | | |
|---|---|---|
| Water | 72.00% b.w. | Viscosity approx. 250 |
| Bayhibit AM | 14.00% | cPs (at 20 C.) |
| Dequest 2010 | 4.00% | ph adjusted to 7.2 |
| KOH flakes | 8.00% | clear, blue, homogenous |
| Dowfax 2A1 | 1.50% | product approx. 11% of |
| Natrosol 250 HHR | 0.40% | active ingredients |
| Neptun blue (dye) 50% | 0.10% | |

In still other tests, powder ingredients were compounded together for subsequent pressing into form of blocks or tablets. The process of disintegration of blocks or tablets can be delayed by using specific chemicals for that purpose, which in turn may delay the release of active matters into process water of the evaporative cooler.

| One tested composition consisted of: (3) | |
|---|---|
| Sod. carbonate | 65.00% b.w. |
| PBTC, tetrasodium salt # V 801 | 20.00% |
| HEDP | 4.00% |
| Sod. hexametaphosphate | 5.00% |
| Sod. tripolyphosphate | 5.00% |
| surface active agent | 1.00% |
| water for pressing, additives | q.s. |

It is possible to prepare other solid compositions, for instance with NTA $Na_3$ (Nitrilotriacetic acid, trisodium salt), or using ATMP, or PMA; possibly also with compounds to retard disintegration of tablets or for a better binding of powder ingredients.

In another run a sponge-like product was tested. The stock solution of the water phase for this sponge-like product described below contained:

| | | |
|---|---|---|
| water | 71.00% b.w. | (4) |
| PMA | 12.00% | |
| HEDP | 10.00% | |
| Potassium hydroxide 45% | 7.00% | |
| surface active agent, dye, etc. | q.s. | |

For the plastic phase HYPOL 2002 or HYPOL 4000 were used in ratio 1:1 with water phase (or, 40/60 proportion with water phase), at different mixing temperatures, using also possibly different speed of mixing, to obtain larger or smaller pores in the final product and for a good material consistency.

(Natrosol is a trademark of Hercules, Inc., Tixogel is a trademark of United Catalysts, Inc., Dowfax is a trademark of The Dow Chemical Co., Bayhibit is a trademark of MOBAY Corp., Dequest is a trademark of Monsanto Co., Hypol is a trademark of W. R. Grace & Co., Belclene is a trademark of CIBA-GEIGY Corp., Unihib is a trademark of Lonza, Inc., Mayoquest and Mayosperse are products of Mayo Chemical Co., MASTERcool is a trademark of Arvin Air Co.)

The Method and Operation of Evaporative Coolers Without Bleed-Off

In order that only that much water is used as needed to obtain the desired cooling effect by its evaporation at peak performance of the evaporative cooler, the following concept and method of completely cancelled bleed-off has been conceived. For it I used another blends of water treatment chemicals, entirely different from those used for a partial reduction of bleed-off and listed above.

For testing of total hardness of process water the Taylor kit K-1503 could not be used as directed by its manufacturer. It was necessary to dilute the sample of process water to be tested by a volume of water purified by the reverse osmosis method, first 1:4, and then 1:24. That is, at first 1 ml of process water to be tested for total hardness was diluted to make 5 ml of solution for testing, and then 1 ml of process water was diluted to make 25 ml of tested solution for analysis using K-1503 kit. Owing to this necessity, some inaccuracies in the figure of total hardness may exist.

The same model of evaporative cooler of the prior art, which was a commercially available MASTERcool TM with 6,500 cfm air flow, was used with its bleed-off line plugged and sealed. Into its basin with circulating process water I added about 200 ml of product (5) and then that evaporative cooler was operated for about 10–14 hours per day. Content of scalants in circulating process water was measured (expressed as Total hardness) and recorded. The daily increment of TH was observed to be from about 400 mg/L to about 600 mg/L, depending on the humidity of ambient air and current concentration of scalants in process water. With presence of new chemical agent (5), formulated for this method, the cooling was good. The temperature drop was anywhere from 18° to 31° F., depending on the day time and the humidity of ambient air. The Dew Point during testing period was mostly in range between 40° to 54° F., but for a number of days it was at about 57°–64° F. and then cooling was less efficient.

The circulating process water was drained from basin after 11 weeks, the heat exchange media were rinsed and new raw water was filled in with another product (6).

| Sample of product for "No bleed-off" cooling. (5) | | |
|---|---|---|
| water | 27.1% b.w. | pH of blend: 2.2 |
| PBTC | 60.0% | Content of active matters: |
| HEDP | 10.0% | about 43.0% |
| BTC 2125M (80%) | 0.4% | |
| Belsperse 161 | 2.0% | |
| Belcor 575 | 0.5% | |

| Another composition of chemical agent for the same application: (6) | | |
|---|---|---|
| water | 29.0% b.w. | pH 2.4 |
| PBTC | 50.0% | Content of active matters: |
| HEDP | 10.0% | about 41.0% |
| Belsperse 161 | 8.0% | |
| Belclene 400 | 2.0% | |
| BTC 2125M (80%) | 0.5% | |
| Belcor 575 | 0.5% | |

For introduction of product (6) its 200 ml portion was mixed with water to make 32 fl.ozs, filled into plastic bottle attached via a tiny plastic polyethylene (PE) tubing to a modified float valve in one arrangement of the following description. Every time, upon evaporation of a portion of process water with the flow of raw water also a small portion of this product (6) was introduced to the basin. This was a way of supplying always a fresh charge of chemical agent into process water, instead of using a "batch" supply of product (5) as in the previous experiment.

However, in order to facilitate operation of evaporative cooler in the "no bleed-off" method, a sequence of steps for its automatized operation has been conceived as follows. With a fully automated operation there would be no need to drain and clean the cooler in a physically and time consuming procedure.

This "environment friendly" evaporative cooler operates in four automated cyclic phases:
a) Starting new batch of fresh water with chemical agents present,
b) Operation,
c) Draining, after operation ceased,
d) Rinsing followed by next draining.

Operation is preceded by filling fresh raw water into water basin of the cooler and adding specific chemicals to treat water hardness minerals content. The length of the phase "Operation" depends on, and is determined by
a) the size and model of evaporative cooler,
b) the designed volume of raw water needed for its operation,
c) the specified volume of air drawn through it,
d) the chemical quality of raw water used (especially its hardness level),
e) the physical quality of ambient air (namely, prevailing humidity content and prevailing temperature).
At the predetermined time the control module of "no bleed-off" evaporative cooler will stop operating the cooler, will close the raw water line valve, open the drain and the whole content of water basin shall be evacuated to drain.

As soon as "Draining" is completed the control module shall close the drain and open raw water inlet valve, and with sufficient level of water in basin the water pump shall deliver process water to rinse the heat exchange media by cascading over them. During this rinsing the heat exchange media are cleaned from hardness minerals remaining on their surface, and are prepared for the next cycle of operation. After a predetermined time period of rinsing/cascading the control module opens drain valve again and the rinsate is drained.

Following completion of "Rinsing" phase the water basin shall be filled with raw water up to the operational level, and when full a dosage of water treatment chemical agent and possibly some other agents (algicide, fungicide, anti-corrosive agent) shall be injected from the installed container(s). Then the next cycle, "Operation", shall again proceed. During "Operation" phase there will be maintained a sufficient content of prorated hard water treating chemical agent to control physical and chemical behavior of scalants.

In operating evaporative coolers under this new method it is now possible, for the first time ever, to conserve every drop of process water which is not needed for its proper function. Large volumes of process water discharged continuously in the prior art in bleed-off are eliminated. The presence of highly effective chemical means controls undesirable effects of water hardness minerals, helps to prevent their deposition over sensitive parts of the cooler, especially over its heat exchange media. The small and rather insignificant volume of process water periodically discharged in "Draining" will remove highly concentrated water hardness minerals and other organic or inorganic impurities from the system, and,prepare it for the next cycle.

Volume of water conserved in about 1000 hours of operating the described evaporative cooler of the prior art under this new method without bleed-off was calculated to be more than 6,000 gallons. (The cooler of this method was operated for about 15 hours a day for 71 days. The nominal water usage rate, when that cooler is operated in the prior art, is 27 gallons per hour, incl. bleed-off of about 5.9 gph.)

In the arrangement described hereabove it is possible
to maintain production of cool air on desired level,
to conserve maximum of raw water, which advantage no other existing system of the prior art can offer,
to provide for a trouble,free operation of the evaporative cooler, with a minimum need for physical care and/or maintenance,
to dispose with the need for periodical manual in-season or after-season cleaning.

This above described method and arrangement is by far the most advanced approach to efficiently operate evaporative cooler, with unprecedented economy of water usage. The heart of this operational arrangement is the control module. It is a programmable electroservo mechanism which controls and/or regulates
a) duration of "Operation" phase, before "Draining" phase begins,
b) beginning of "Draining" phase, inflow of raw water, opening of the bottom drain and evacuation of process water contaminated with scalants,
c) closing of the bottom drain and opening of the inflow of raw water for a specified water level. Then, water pump shall deliver fresh water for cascading over heat exchange media to rinse and to flush down all impurities from them;

d) repetition of step b), e) closing of the bottom drain after completed "Rinsing" phase, opening of the inflow of raw water up to a specified level, while specified volumes of a concentrated chemical means for treatment of raw water shall be injected, and f) starting of the water pump for the "Operation" phase.

Some of these functions can be programmed in site, for instance a) the length of "Operation" phase, b) the volume(s) of injected chemical agent(s), c) the frequency of injecting the chemical agent(s).

The task b) and c) hereabove can reflect situation when different chemical agents with variations in concentration of their active agents would be used, for instance. Sensors in some more sophisticated models of control modules in larger and largest coolers can detect the humidity content of ambient air and its current temperature, the two characters most affecting the evaporative cooling process. Input of these data can provide for instant changes in operational setup for immediate maximum cooling output of such evaporative cooler at any time.

Instructions for some other tasks shall be fixed in module's memory. Opening the drain can be linked to closing the raw water inflow valve, closing the drain can be activated shortly after the raw water inflow valve is opened, a specified time to run water pump to rinse down the heat exchange media can be set. The control module has also a "manual"/"auto" toggle switch. When set in the "manual" mode, operation of otherwise automatized system is suspended and is now under control of the operator.

Introduction of Chemical Agent

Different ways for controlled introduction of active chemicals into the circulating water of evaporative cooler were conceived and tested:

(a) gravity feed, (b) combination gravity+dilution feed, (c) vacuum feed, (d) controlled pressure feed, (e) plastic sponge time release, (f) solid tablets or blocks time release.

For instance, the basic formula (1) was modified with 0.2% of a thickening agent to increase its viscosity to about 25 cPs, and then was filled to a suitable size plastic bottle with a drip cap. In the bottom of the bottle a minute hole was punctured with needle for air pressure equalization, and the bottle, fastened with a spring clip to the body of the evaporative cooler, hung inverted with its drip cap submerged in a circulating process water in the basin. The observed dispensing rate of a product so modified was about 5–12 ml per day. This simple way is considered a 'gravity feed'.

Another way of introduction, complementary to the above was tested on the lab bench, using a product (2) more viscous (with a slightly higher percentage of thickener). This product was fed into a plastic bottle, where a tiny hole was punctured in its bottom for equating air pressures, was closed with a drip cap over a thin ring of plastic foam inserted inside the neck below the cap, and hung on the lab stand with the cap submerged in the water in a calibrated cylinder. This product of increased viscosity would saturate the plastic foam insert and then would be slowly washed out by a circulating process water, which would result in slow release of the agent to process water. The rate of release would be about 4–10 ml of product per day, depending on the size of the bottle, height of product in it, and its gravital force. This method could possibly be economic and useful alternate way to control release of active ingredients to circulating process water of the evaporative coolers.

Still another option for introduction of the liquid agent to the process water in the basin of the cooler was tested again on the lab bench. Small plastic aspirator (NALGENE Products, cat. #6140-0010) was attached with a short piece of a clear polyethylene (PE) tubing to the discharge end of the water supply float valve. Inverted plastic bottle—with sufficient supply of liquid product (1) but with slightly increased viscosity—was connected to the vacuum port of the aspirator (using a short piece of PE tubing). Whenever the water float valve opened and a fresh supply water was delivered to the basin, also a small volume of liquid was drawn from the inverted plastic bottle (no hole punctured in its bottle this time) by the negative pressure caused by the aspirator device. When the float valve closed, the negative pressure in the plastic bottle was cancelled by a small volume of air (and possibly liquid) drawn back from the connecting PE tubing into the bottle. A small volume of liquid agent was ready to be again released next time when the water supply float valve opened to deliver another charge of supply water to the basin with circulating process water. This method is seen as another concept of delayed introduction of liquid agent into the circulating process water.

In another viable arrangement a small, preferably plastic, T-type connector 46 (FIG. 3) is attached with one end to the outlet of water float valve 42 regulating level of water 33 in the basin 32. From the second end of connector 46 a convenient length of plastic tubing 34 of narrow diameter diverts a portion of supply raw water—when the valve opens its flow—to a container 28 with supply of concentrated chemical agent 35. This tubing is inserted through the neck of container and, ends at its bottom, and in a convenient position it has inserted a small plastic, corrosion resistant check valve 44 to prevent back-flow of liquid agent 35 in periods when no supply water flows to the basin with process water (and, at the same time, to the container with liquid agent). At the top of the container 28 another narrow inside diameter tubing 36 inserted about 1 inch from its neck in the liquid agent 35, is submerged with the other end in convenient location in the process water 33 in basin. Whenever the float valve 42 opens and raw supply water 31 starts to flow to the basin 32, a portion of it is diverted by the T-connector 46 to the bottom of the container 28 with liquid agent 35, from where it forces out small volume of liquid chemical agent 35 through the outlet tubing 36 to the process water 33 in basin 32. In this process the raw water mixes with concentrated liquid agent 35 in the container 28, is gradually diluted, and after a predetermined time period the container 28 is replaced by a new container (not shown) with fresh supply of concentrated chemical agent (not shown). A chemical indicator of distinctive color shows the need for its replacement when the content in container is colorless. The third end of T-type connector 46 delivers raw supply water to the basin 32 whenever the float valve 42 opens flow of water in response to the position of float 40. This is the preferred arrangement for a controlled delivery of liquid concentrated chemical agent to the process water.

Quite a different way to introduce active chemicals into the evaporative cooling system is in preparing a homogenous mixture of a plastic polymer phase and water phase. A sponge-like foam of rigid consistency can be obtained, after chemical reaction between those two phases. The total content of active chemical ingredients to treat raw water is mixed in the water phase, which during the process of plastic foam production is evenly distributed through the mass of the foam. A small piece of this foam, when immersed in process water in the basin of the system can provide for a time delayed release of active agents into process water, and for their slow introduction to the circulating water. The plastic foam, a hydrophilic polyurethane polymeric product—Toluene diisocyanate (TDI), or MDI (Methylene Diphenyl isocyanate), both commercially available under the brand name HYPOL, is made by mixing either one of this pre-polymeric phase and water phase containing active chemicals.

The water phase described above contains all water soluble ingredients desired for the complex chemical action (e.g. algaecides, corrosion retardants, antiscaling agents, pigments and/or color pH change indicators, etc.). Color change pH indicators may be used in order to indicate the final stage, when all active ingredients are washed out from pores of the sponge-like product, after they were released to process water, signaling a need for replacing the 'sponge'. It is, of course, possible to prepare different grades of this sponge-like product, with a differently graded content of active chemicals for water treatment, so that it can be used to treat specific level of water hardness minerals.

The last method of introduction of chemical agent(s) into circulating water consists of using either a) tablets with pre-calculated content of active matters and with exact weight of the tablet (preferably, 3 inches in diameter and 1 inch thick, and of about 11% active matters), so that the total content of active matters controls a specific volume of process water circulating in evaporative cooler. This represents the 'batch delivery' of active ingredients.

b) blocks with a pre-calculated content of active matters, possibly placed in dispensers submerged in process water. This arrangement could be conveniently used in larger systems for evaporative cooling.

It is shown, that the choice chemical agents needed to control deposition of scalants from the circulating process water in evaporative coolers can be dependably delivered in any of these described different ways.

Those skilled in the art will realize, that other new chemical substances and other arrangements for their introduction into circulating water could be made available for achieving the object of the present invention, while departing to a greater or to a lesser degree from the aforesaid examples. It is to be understood that these examples, while showing preferred way of carrying out the invention presently known to me, are in no way limiting to the concept of conservation of water in operating evaporative coolers.

Various modifications of this invention are possible which will be apparent to those skilled in the art and which can be resorted to without departing from the spirit and scope of the invention as defined by the following claims.

I claim:

1. In a method of operating manufactured evaporative coolers having heat exchange media wetted with circulating water wherein ambient air is drawn through said wetted heat exchange media to cool the air, said evaporative cooler further including a water basin to supply said circulating water to the heat exchange media, and, wherein said manufactured cooler has a bleed-off value of process water directed by the manufacturer of said evaporative cooler, said method comprising the steps of:
   (a) supplying a volume of a raw supply water needed for said evaporative cooler operation, said raw supply water having water hardness scalants contained therein;
   (b) using said supply water for circulating within, and for continuous wetting of said heat exchange media of said evaporative cooler; and
   (c) discharging a volume of the circulating water as bleed-off from said evaporative cooler in accordance with the manufacturer's directions in order to reduce the concentration of scalants in the circulating water, and replenishing said discharged bleed-off portion with said raw supply water;
   the improvement comprising operating said evaporative cooler in order to conserve water by
   (d) reducing the volume of that portion of the circulating water bleed-off of step (c), said reduced volume being from about 5 up to 90 percent by volume as calculated from said manufacturer's directions, thereby increasing the concentration of scalants in the circulating water, and, at the same time;
   (e) adding an anti-scale effective volume of anti-scale chemicals to the circulating water; whereby said anti-scale chemicals intervene with the harmful activity of said increased concentration of said raw supply water scalants, wherein said chemicals are introduced to said evaporative cooler in a liquid form in a metered fashion, using pressure of raw supply water flow downstream from a float valve responsive to a float located in said water basin, said raw supply water being at least partially diverted to a container with a supply of said chemicals to introduce a desired amount of said chemicals into said circulating water in said water basin in such an arrangement that a check valve on a raw supply water line downstream from said float valve but upstream of said container prevents a back flow from said container with said chemicals.

2. The method of claim 1, wherein said anti-scale chemicals comprise water as a vehicle, and at least one active chemical ingredient selected from the group consisting of
   (a) 1-hydroxyethylidene-1, 1-diphosphonic acid (HEDP) or its water soluble salts,
   (b) polymaleic acid (PMA) or its co-polymer and water soluble salts thereof,
   (c) 2-phosphonobutane-1,2,4-tricarboxylic acid (PBTC) or its water soluble salts,
   (d) polymeric phosphinocarboxylic acid or its water soluble salts,
   (e) aminotri(methylene phosphonic acid) (ATMP) or its water soluble salts,
   (f) Nitrilotriacetic acid (NTA) or its water soluble salts,
   (g) Sodium triphosphate, or, sodium hexametaphosphate, and
   (h) mixtures thereof, the total amount of active ingredients in said circulating water being from 0.5 to 500 mg/L (ppm) calculated on said total volume of raw supply water.

3. The method of claim 2, wherein the said total amount of active ingredients is from 2 to 10 mg/L (ppm) calculated on said volume of raw supply water.

4. The method of claim 1, wherein said improvement includes the step of continuously introducing said chemicals in metered fashion.

5. The method claim 1 wherein said anti-scale chemicals comprise water as a vehicle, and at least one active chemical ingredient from the group consisting of:
 (a) 1-hydroxyethylidene-1, 1-diphosphonic acid (HEDP) or its water soluble salts,
 (b) polymaleic acid (PMA) or its co-polymer and water soluble salts thereof,
 (c) 2-phosphonobutane-1,2,4-tricarboxylic acid (PBTC) or its water soluble salts,
 (d) polymeric phosphinocarboxylic acid or its water soluble salts,
 (e) aminotri(methylene phosphonic acid) (ATMP) or its water soluble salts, and mixtures thereof.

6. In a method of operating manufactured evaporative coolers having heat exchange media wetted with circulating water wherein ambient air is drawn through said wetted heat exchange media to cool the air, said evaporative cooler further including a water basin to supply said circulating water to the heat exchange media, said evaporative coolers having also bleed-off means for discharging portion of mixture of circulating water and water hardness minerals contained therein from said evaporative cooler, said method comprising the steps of:
 a) filling said water basin with a volume of said raw supply water, said raw supply water having content of hard water minerals contained therein
 b) using said raw supply water for circulating within said evaporative coolers and for continuous wetting of said heat exchange media of said evaporative coolers, and
 c) discharging a volume of said circulating water as bleed-off from said evaporative coolers, and replenishing said bleed-off portion with another portion of said raw supply water;
 the improvement comprising operating said evaporative coolers in order to conserve water by
 d) continuously providing a full volume of said raw supply water of step (a) and fully closing said bleed-off of said evaporative coolers or otherwise not discharging that portion of said circulating water as bleed-off from said evaporative coolers,
 e) adding chemical means into said circulating water, wherein said chemical means are introduced to said evaporative cooler in a liquid form in a metered fashion, using pressure of raw supply water flow downstream from a float valve responsive to a float located in said water basin, said raw supply water being at least partially diverted to a container with a supply of said chemical means to introduce a desired amount of said chemical means into said circulating water in said water basin in such an arrangement that a check valve on a raw supply water line downstream from said float valve but upstream of said container prevents a back flow from said container with said chemical means,
 f) from time to time draining said circulating water completely from said evaporative cooler when the content of said hard water minerals in said circulating water has reached a predetermined level,
 g) rinsing said water basin and said heat exchange media of said evaporative cooler with raw supply water, and
 h) re-filling said evaporative cooler with fresh raw supply water and said chemical means for a next operating cycle.

7. The method of claim 6, wherein said selected chemical means contain a suitable surfactant(s) and at least one active ingredient comprising:
 (a) 1-hydroxyethylidene-1, 1-diphosphonic acid (HEDP) or its water soluble salts,
 (b) polymaleic acid (PMA) or its co-polymer and water soluble salt thereof,
 (c) 2-phosphonobutane-1,2,4-tricarboxylic acid (PBTC) or its water soluble salts,
 (d) polymeric phosphinocarboxylic acid or its water soluble salts,
 (e) aminotri(methylene phosphonic acid) (ATMP) or its water soluble salts,
 (f) Nitrilotriacetic acid (NTA) or its water soluble salts,
 (g) Sodium triphosphate, or, Sodium hexametaphosphate, and
 (h) mixtures thereof.

8. The method of claim 6, wherein operating said evaporative coolers is arranged in a continuous repetitive cyclic fashion, said cyclic fashion comprising phases of variable length of:
 a) starting phase,
 b) operational phase,
 c) draining phase, and
 d) rinsing phase,
 wherein the sequence, the selection, the change, and/or initialization of said phases can be done either in a 'manual' fashion by the decision of the operator of said evaporative cooler or in 'auto' fashion by a pre-programmed control module comprising electroservo mechanism and computer memory board(s) as part of said evaporative cooler.

9. The method of claim 6 wherein said chemical means are introduced to said container in a solid form of pellets, tablets, or blocks.

10. The method claim 6 wherein said chemical means comprise water as a vehicle, and at least one active chemical ingredient from the group consisting of:
 (a) 1-hydroxyethylidene-1, 1-diphosphonic acid (HEDP) or its water soluble salts,
 (b) polymaleic acid (PMA) or its co-polymer and water soluble salts thereof,
 (c) 2-phosphonobutane-1,2,4-tricarboxylic acid (PBTC) or its water soluble salts,
 (d) polymeric phosphinocarboxylic acid or its water soluble salts,
 (e) aminotri(methylene phosphonic acid) (ATMP) or its water soluble salts, and mixtures thereof.

11. A method of operating a manufactured evaporative cooler having a heat exchange media wetted with circulating water wherein ambient air is drawn through said wetted heat exchange media to cool the air, said evaporative cooler further including a water basin to supply said circulating water to the heat exchange media, said method comprising the steps of:
 (a) charging said water basin of said evaporative cooler with an initial volume of raw process water containing water hardness minerals therein;

(b) circulating said raw process water over said heat exchange media to cool ambient air drawn through said media;

(c) evaporating some of the circulating water thereby increasing the concentration of the water hardness minerals in the remaining circulating process water;

(d) permitting the concentration of water hardness minerals in the circulating process water to increase by adding an additional volume of raw process water containing water hardness minerals therein to the evaporative cooler and by reducing or cancelling bleed-off of the circulating water;

(e) providing chemical agent(s) for controlling crystallinic deposit of the water hardness minerals, and (f) introducing said agent(s) into said circulating water in an amount effective to control deposit of the water hardness minerals in the circulating water, thereby permitting the concentration of minerals in said circulating water to be increased in comparison with the content of said minerals in said raw supply water, wherein said chemical agent(s) are introduced to said evaporative cooler in a liquid form in a metered fashion, using pressure of raw supply water flow downstream from a float valve responsive to a float located in said water basin, said raw supply water being at least partially diverted to a container with a supply of said chemical agent(s) to introduce a desired amount of said chemical agent(s) into said circulating Water in said water basin in such an arrangement that a check valve on a raw supply water line downstream from said float valve but upstream of said container prevents a back flow from said container with said chemical agent(s).

12. The method of claim 1, wherein said chemical agent(s) comprises water as a vehicle and at least one active chemical ingredient from the group consisting of:
(a) 1-hydroxyethylidene-1, 1-diphosphonic acid (HEDP) or its water soluble salts,
(b) polymaleic acid (PMA) or its co-polymer and water soluble salts thereof,
(c) 2-phosphonobutane-1,2,4-tricarboxylic acid (PBTC) or its water soluble salts,
(d) polymeric phosphinocarboxylic acid or its water soluble salts,
(e) aminotri(methylene phosphonic acid) (ATMP) or its water soluble salts,
(f) Nitrilotriacetic acid (NTA) or its water soluble salts,
(g) Sodium triphosphate, or, sodium hexametaphosphate, and
(h) mixtures thereof;
the total amount of active ingredient(s) in said raw supply water circulating in said evaporative cooler being from 0.5 to 500 mg/L (ppm) calculated on said total volume of raw supply water.

13. The method of claim 12, wherein the total amount of active ingredient is from 2 to 10 mg/L (ppm) calculated on the total volume of said raw supply water.

14. The method of claim 12, wherein said chemical agent also contains a suitable surfactant or surfactants in an amount from 0.1% to 10% based on total weight of said chemical agent.

15. The method of claim 11, including the step of continuously introducing said agent in a metered fashion.

16. The method claim 11 wherein said chemical agent(s) comprise water as a vehicle, and at least one active chemical ingredient from the group consisting of:
(a) 1-hydroxyethylidene-1, 1-diphosphonic acid (HEDP) or its water soluble salts,
(b) polymaleic acid (PMA) or its co-polymer and water soluble salts thereof,
(c) 2-phosphonobutane-1,2,4-tricarboxylic acid (PBTC) or its water soluble salts,
(d) polymeric phosphinocarboxylic acid or its water soluble salts,
(e) aminotri(methylene phosphonic acid) (ATMP) or its water soluble salts, and mixtures thereof.

17. A method of operating an evaporative cooler, said cooler having heat exchange media wetted with circulating cooling water wherein ambient air drawn through said wetted heat exchange media cools the air, said evaporative cooler further including a water basin to supply said circulating water to the heat exchange media, and means for directing said cooled air to a situs to be cooled by said cooled air, and bleed off means to remove and discharge a portion of said circulating cooling water, said method comprising the steps of:

(a) providing; cooling water to said water basin of said evaporative cooler, said cooling water being a mixture of a selected chemical agent(s) and raw supply water containing water hardness materials, wherein said chemical agent(s) are introduced to said evaporative cooler in a liquid form in a metered fashion, using pressure of raw supply water flow downstream from a float valve responsive to a float located in said water basin, said raw supply water being at least partially diverted to a container with a supply of said chemical agent(s) to introduce a desired amount of said chemical agent(s) into said circulating water in said water basin in such an arrangement that a check valve on a raw supply water line downstream from said float valve but upstream of said container prevents a back flow from said container with said chemical agent(s);

(b) continuously recirculating said cooling water in direct contact with said heat exchange media and drawing ambient air through said heat exchange media to cool said air;

(c) directing said cooled air to a situs to be cooled by said cooled air;

(d) increasing the minerals content of the circulating water to the quantity wherein minerals in said circulating water will precipitate by diminishing the bleed-off of said circulating water; and (e) delaying the precipitation of said minerals in said circulating water of step (d) by selecting said chemical agent(s) and mixing them with said raw supply water in an amount effective to suspend said minerals in said cooling water, whereby the volume of raw supply water necessary to cool a given volume of air is reduced thereby improving the economy in using natural water resources.

18. The method claim 17 wherein said chemical agent(s) comprise water as a vehicle, and at least one active chemical ingredient from the group consisting of:
(a) 1-hydroxyethylidene-1, 1-diphosphonic acid (HEDP) or its water soluble salts,
(b) polymaleic acid (PMA) or its co-polymer and water soluble salts thereof,
(c) 2-phosphonobutane-1,2,4-tricarboxylic acid (PBTC) or its water soluble salts,
(d) polymeric phosphinocarboxylic acid or its water soluble salts,
(e) aminotri(methylene phosphonic acid) (ATMP) or its water soluble salts, and mixtures thereof.

* * * * *

UNITED STATES PATENT AND TRADEMARK OFFICE
CERTIFICATE OF CORRECTION

PATENT NO.   : 5,401,419
DATED        : MARCH 28, 1995
INVENTOR(S)  : Sidney Z. Kocib It is certified that error appears in the above-indentified patent and that said Letters Patent is hereby corrected as shown below:

Cover Page,    left hand column, line 4, change "Lake Haven City" to --Lake Havasu City--.

Column 3,      line 36, change "80%" to --90%--.

Column 6,      line 59, change "sealants" to --scalants--.

Column 8,      line 29, change "to of" to --to 80% of--.

Column 16,     line 50, change "comma" (,) after "trouble" to a hyphen -- ( - ) --.

Column 23,     line 35, change "claim 1" to --claim 11--.

Column 24,     line 20, delete semicolon "(;)" after "providing".

Signed and Sealed this

Twenty-fourth Day of October, 1995

Attest:

BRUCE LEHMAN

*Attesting Officer*       *Commissioner of Patents and Trademarks*